March 12, 1946.    V. R. ABRAMS    2,396,233
FILLER CAP AND RELIEF VENT
Filed July 20, 1943

INVENTOR
Victor R. Abrams
BY
C. E. Herrstrom & H. E. Thibodeau
ATTORNEY

Patented Mar. 12, 1946

2,396,233

UNITED STATES PATENT OFFICE 2,396,233

FILLER CAP AND RELIEF VENT

Victor R. Abrams, Detroit, Mich.

Application July 20, 1943, Serial No. 495,433
3 Claims. (Cl. 220—44)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel filler cap and relief vent intended primarily for use in connection with the fuel tank of a motor vehicle.

It is well known in practice that the burning of an overturned vehicle can frequently be traced to leakage of gasoline from the fuel tank. Even when the tank is not damaged, leakage may occur through the usual vent. Consequently, it has been found desirable to provide a gravity-closing vent to avoid such leakage.

Such a device, however, is objectionable in that it seals the tank and permits, under such conditions, the internal vapor pressure to reach the bursting point. The object of the invention is to overcome this difficulty and is accomplished by the use of a spring mounting which enables the entire vent assembly to move outward a short distance from the tank and thus relieve the accumulated pressure. Although some fuel may escape when the vent is opened in this manner, this condition does not occur until some time after the accident. The danger of fire is considerably less at this time than immediately after the accident.

The invention is fully disclosed in an illustrative embodiment in the following description and in the accompanying drawing in which.

Figure 1:
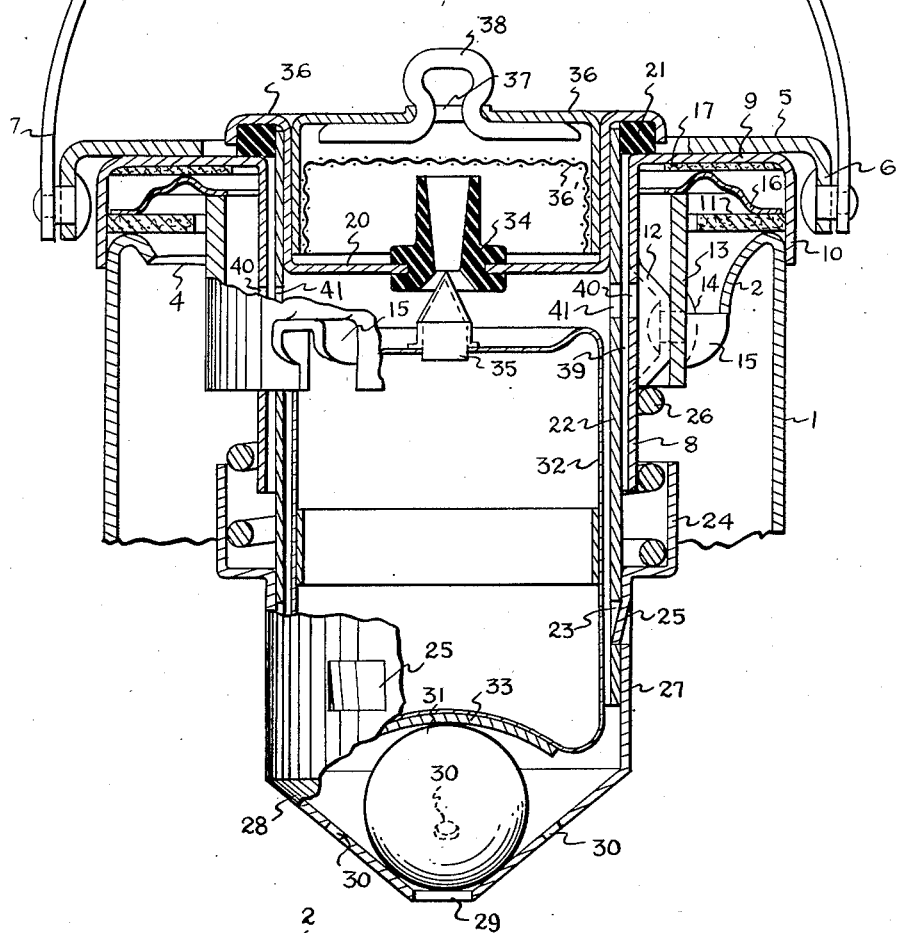
Figure 1 is a vertical section of the device, partly in elevation.
Figure 2:
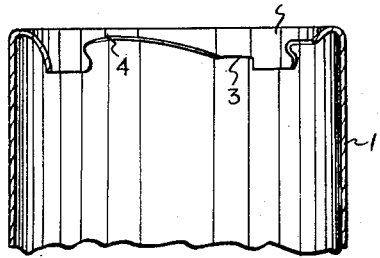
Figure 2 is a detail of the filler neck.

The numeral 1 designates a filler neck attached in a suitable manner to a liquid receptacle such as the fuel tank of an automotive vehicle. The upper end of the neck has an inwardly turned flange 2 formed with slots 3 and cam surfaces 4 for locking the filler cap, as will presently be described.

The cap structure includes a top ring 5 having a downwardly extended outer flange 6 to which is pivotally attached a bail 7. A tube 8 is secured to the lower surface of the ring 5 by an outwardly extending flange 9 at its upper end. The flange 9 has its outer edge turned downwardly at 10 to enclose a flat sealing disk 11 adapted to seat upon the member 1 as shown. A number of lugs 12 are stamped outward from the tube 8 to carry a locking ring 13 attached to the tube by any suitable means such as rivets 14. Locking lugs 15 are stamped out from the member 13 and are of such dimensions as to be received in the slots 3 and moved under the cam edges 4. A resilient spacer ring 16 is secured upon the member 13 and is shaped to engage a spacer disk 17 on the lower surface of the flange 9 and to support the sealing disk 11. In this manner a limited resiliency is provided in locking the lugs 15 in the member 1.

A dished member 20 is fitted in the tube 8 and carries at its upper end a gasket 21 which seats upon the tube. From the member 20 is suspended a cylinder 22 having a staggered series of slots 23 near its lower end. A spring seat 24 surrounds the cylinder 22 as well as the lower end of the tube 8 and is formed with tongues 25 received and supported in the slots 23. A coil spring 26 rests in the seat 24 and bears upwardly against the lugs 12. The member 24 is extended downwardly at 27 and terminates in an inverted conical bottom 28 formed with a central opening 29 and lateral openings 30 for a purpose that will presently be described. The member 24, 27 is attached by being slipped on the lower end of the cylinder 22, whereupon the tongues 25 snap into the slots 23.

In the conical bottom 28 is received a heavy sphere 31 such as a steel ball. The cylinder 22 receives a float 32 which may be formed as a light, hollow metal shell. The bottom of the shell carries on the outside a concave wear plate 33 resting on the ball 31.

The bottom of the dished member 20 has inserted therein a grommet 34 constituting a seat for a vave member 35 carried by the top of the float 32.

Into the dished member 20 is inserted a removable vent cap 36 having a vent hole 37 in which a finger piece 38 is loosely inserted. The cap is lined with a screen 36' to keep dust out of the grommet and float chamber. The grommet may be cleaned on removing the cap. The members 8 and 22 are slightly spaced apart as indicated by the numeral 39 and are formed with registering openings 40 and 41 respectively for venting.

Vapor pressure developed within the liquid receptacle is relieved normally through the apertures 40 and 41, the grommet 34 and the vent hole 37. The float closes the grommet 34 on the occurrence of normal expansion of the fuel in the tank, normal inclination of the vehicle, and during flow-back from another fuel receptacle carried by the vehicle. If the vehicle carrying the receptacle should be overturned, the ball 31 will ride on the conical surface 38 and displace the float 32 until the valve member 35 closes the grommet 34. In this manner, leakage of fuel through the vent hole 31 is avoided. The fire hazard due to spilled fuel from an overturned motor vehicle is thus substantially eliminated.

With the vehicle in an overturned condition and the vent closed, there is a possibility that vapor pressure will develop to the bursting point in an unvented fuel tank. This possibility is avoided in the present case by the provision of the spring 26 which holds the dished member 20 seated on the tube 8. The internal pressure, before reaching the bursting point will lift the float container 22, 27 and retainer 24 against the pressure of the spring 26 and lift the member 20 at the upper end of the tube 8. The receptacle is then vented through the apertures 40 and the space formed between the gasket 21 and the top of the tube 8. Also, the pressure within the float receptacle is relieved through the openings 29, 30 and 41 which also serve as another relief path for pressure in the fuel receptacle.

The tank is filled on removing the entire assembly by turning the ring 5 to detach the lugs 14 from the flange 2 of the member 1.

Although a specific embodiment of the invention has been illustrated and described, it will be understood that various alterations in the details on construction may be made without departing from the scope of the invention as indicated by the appended claims.

What I claim is:

1. In combination with a filler neck, a filler cap and relief vent comprising a ring member adapted for insertion in said neck and to seat thereon, a hollow body supported in and normally seated on said member and having an axial vent opening adjacent the upper end thereof, a compressible spring surrounding the body and inserted between said member and said body and urging said body into seating engagement with said member, a float movable in said body below said vent opening, a valve carried by said float at the upper end thereof and adapted to close said vent opening upon movement of said float toward said vent opening, a free weight beneath said float normally supporting the same, said weight resting on the bottom of said body and adapted to move said float and valve toward said vent opening to close the latter upon inclination of said filler neck, a tube extending from said ring member and encircling said body, said tube and said body having apertures therethrough to communicate pressure to the interior of said body, and means on said tube and body forming abutments for the respective ends of said spring.

2. In combination with a filler neck, a filler cap and relief vent comprising a ring member adapted for insertion in said neck and to seat thereon, a hollow body supported in and normally seated on said member and having an opening therein adjacent the upper end thereof, a resilient grommet in said opening and provided with an axial vent therethrough, a compressible spring surrounding said body and disposed between said member and said body and urging said body into seating engagement with said member, a float movable in said body below said vent opening, said float having an arcuate bottom wall, a valve carried by said float at the upper end thereof and adapted to engage said grommet and to close said vent upon upward movement of said float, said body having a substantially conical bottom wall, and a spherical weight disposed beneath and normally supporting said float, said weight being supported on the conical bottom wall of said body and adapted upon inclination of said filler neck to move along said conical wall into engagement with the arcuate bottom wall of said float and to move said float and said valve toward said grommet to close the vent therein.

3. In combination with a filler neck, a filler cap and relief vent comprising a ring member adapted for insertion in said neck and to seat thereon, a hollow body supported in and normally seated on said member and having a vent opening, a tube extending from said ring member and encircling said body, an abutment on said tube, a cup shaped member telescopically engaging the lower portion of said body and detachably secured thereto, said cup-shaped member having a shoulder thereon, a compressible spring seated between said shoulder and said abutment and adapted to urge said body into seating engagement with said ring member, a float in said body below said vent opening, a valve carried by said float at the upper end thereof and adapted to close said vent opening upon upward movement of said float, and a free weight beneath said float and supported in the bottom of said cup shaped member and adapted to move said float and said valve toward said vent opening to close the latter upon inclination of said filler neck.

VICTOR R. ABRAMS.